United States Patent
Ahuja et al.

(10) Patent No.: US 6,512,823 B2
(45) Date of Patent: *Jan. 28, 2003

(54) MULTILINE TELEPHONE INCLUDING INTERACTING CALL APPEARANCES

(75) Inventors: Sudhir R. Ahuja, Little Silver, NJ (US); Venkatesh Krishnaswamy, Highland Park, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,124

(22) Filed: Oct. 16, 1998

(65) Prior Publication Data

US 2002/0057779 A1 May 16, 2002

(51) Int. Cl.[7] ................................................ H04M 3/42

(52) U.S. Cl. ..................... 379/207.01; 379/202.01; 379/204.01; 379/205.01

(58) Field of Search ........................... 379/93.07, 93.21, 379/158, 201.01, 202.01, 204.01, 205.01, 207.01, 203.01, 206.01, 421, 422, 423, 429, 430, 156

(56) References Cited

U.S. PATENT DOCUMENTS

| | | | |
|---|---|---|---|
| 3,660,610 A | * 5/1972 | Hestad et al. | ............... 379/203 |
| 4,153,818 A | * 5/1979 | Goodloe et al. | ............ 379/262 |
| 4,215,247 A | 7/1980 | Lambert | |
| 5,034,947 A | * 7/1991 | Epps | ........................... 370/268 |
| 5,109,410 A | * 4/1992 | Suhami et al. | .............. 379/430 |

(List continued on next page.)

FOREIGN PATENT DOCUMENTS

| | | |
|---|---|---|
| EP | 0 762 716 A2 | 3/1997 |
| EP | 0 805 576 A2 | 5/1997 |
| EP | 0 779 732 A2 | 6/1997 |

OTHER PUBLICATIONS

Canadian Intellectual Property Office—Office Action, Dated Dec. 31, 2001, 2 pages (corresponding Canadian application 2,281,351).

Great Britain Paten Office Combined Search and Examination Report, Feb. 28, 2000, 4 pages, (S. R. Ahuja 19–5) Application No. GB 992374.9.

Primary Examiner—Ahmad F. Matar
Assistant Examiner—Bing Bui
(74) Attorney, Agent, or Firm—Thomas Stafford

(57) ABSTRACT

Interacting call appearances are realized by enabling voice input/output to be simultaneously available on any combination of call appearances at a given time on a given terminal. Consequently, a user may, for example, listen to the voice output of one or more call appearances that are active at the terminal at a given time. Additionally, the user may direct voice input to one or more call appearances that are active at the terminal at a given time. Thus, the user, at any given time, may listen or speak to one or more parties on unrelated calls. Additionally, a user can employ more than one voice input/output device at his/her terminal. Specifically, the ability to simultaneously use more than one call appearance at a terminal at a given time is realized by separating call control from media routing and input/output control. Thus, the appearance of a call at a terminal is separated from the voice input/output that is required for the call. To this end, a user terminal or resources available to it must have the capability of mixing multiple channels of audio, as well as, the capability of multiplexing/demultiplexing voice inputs and outputs into and from line appearances.

33 Claims, 1 Drawing Sheet

U.S. PATENT DOCUMENTS

| | | | |
|---|---|---|---|
| 5,373,549 A | * 12/1994 | Bales et al. | 379/93.21 |
| 5,384,772 A | 1/1995 | Marshall | |
| 5,483,588 A | 1/1996 | Eaton et al. | |
| 5,502,762 A | * 3/1996 | Andrew et al. | 379/202.01 |
| 5,734,724 A | * 3/1998 | Kinoshita et al. | 381/17 |
| 5,764,743 A | * 6/1998 | Goedken et al. | 379/156 |
| 5,841,851 A | * 11/1998 | Recht et al. | 379/156 |
| 5,883,945 A | * 3/1999 | Richardson, Jr. et al. | 379/189 |
| 5,898,676 A | 4/1999 | Apfelbeck et al. | |
| 6,178,237 B1 | * 1/2001 | Horn | 379/202.01 |
| 6,418,216 B1 | * 7/2002 | Harrison et al. | 379/208.01 |

\* cited by examiner

MULTILINE TELEPHONE INCLUDING INTERACTING CALL APPEARANCES

TECHNICAL FIELD

This invention relates to telephones and, more particularly, to multi-line telephones.

BACKGROUND OF THE INVENTION

There are known telephone arragements such as multi-line telephones, telephone-based conferencing and computer-based-voice conferencing, which appear to have multi-line capability, but in actuality are only enabled for voice communication to use one line at a time. To this end, multi-line telephones provide a user with a number of call appearances with the ability to talk and listen on any one-call appearance at a given time. Phone-based or computer-based packet-voice conferencing systems enable a user to be a participant in a multi-party call, which provides the user the ability to listen to and talk to all of or a subset of the other participants in the conference call. An important point to note is that in a conference call all the participants belong to the same call or session, which is on one call appearance at the participant's terminal. Typically, each participant in the conference call is aware that he/she is included in the conference call and has some control over when he/she joins or leaves the call. Additionally, each participant may also have some limited control over which of the active participants he/she can hear. In these prior known arrangements, voice input/output at a terminal is only enabled on any one-call appearance at any given time. However, although multiple call appearances maybe active at a given terminal, the user can only speak and listen to one call appearance at a given time. The other active call appearances are considered to be in a "held" state and are not enabled to engage in voice input/output.

SUMMARY OF THE INVENTION

These and other problems and limitations of prior known arrangements are overcome by enabling voice input/output to be simultaneously available on any combination of call appearances at a given time on a given terminal. Consequently, a user may, for example, listen to the voice output of one or more call appearances that are active at the terminal at a given time. Additionally, the user may direct voice input to one or more call appearances that are active at the terminal at a given time. Thus, the user, at any given time, may listen or speak to one or more parties on unrelated calls. Additionally, a user can employ more than one voice input/output device at his/her terminal.

Specifically, the ability to simultaneously use more than one call appearance at a terminal at a given time is realized by separating call control from media routing and input/output control. Thus, the appearance of a call at a terminal is separated from the voice input/output that is required for the call. To this end, a user terminal or resources available to it must have the capability of mixing multiple channels of audio, as well as, the capability of multiplexing/demultiplexing voice inputs and outputs into and from line appearances. Also, each call designated as being active at the user terminal must deliver the media associated with it to the terminal or to the resources available to the terminal.

DETAILED DESCRIPTION

Figure 1:
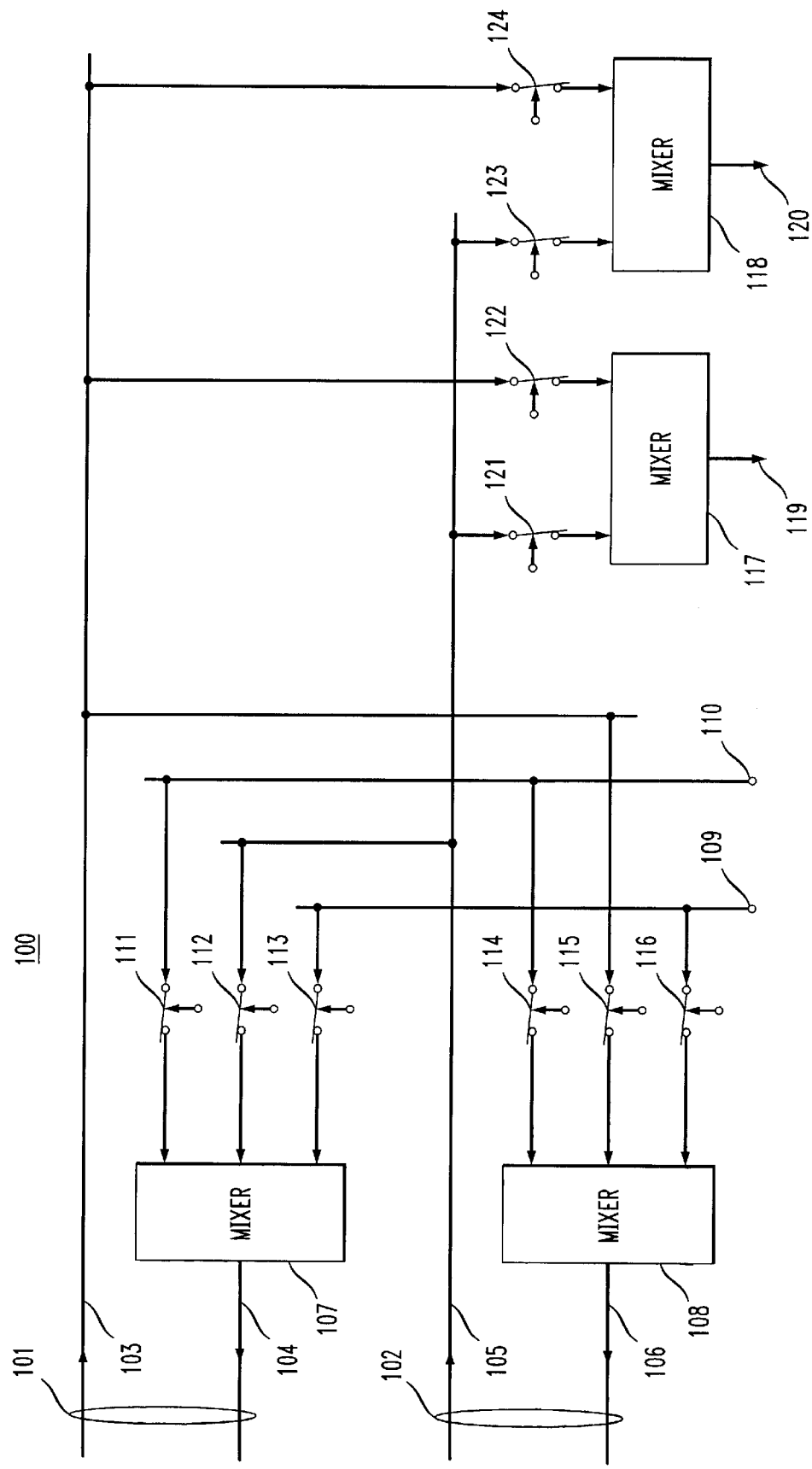
FIG. 1 shows, in simplified block diagram form, details of a terminal arrangement including an embodiment of the invention.

FIG. 1 shows, in simplified block diagram form, details of terminal arrangement 100 including an embodiment of the invention. It is noted that although only two call appearances are shown and will be described for brevity and clarity of exposition, it will apparent that the embodiment is readily expandable to more than two call appearances, namely, N call appearances. Specifically, shown are call appearance 101 including incoming path 103 and outgoing path 104, and call appearance 102 including incoming path 105 and outgoing path 106. Associated with outgoing path 104 is mixer 107 for mixing input signals supplied thereto. Similarly, associated with outgoing path 106 is mixer 108 for mixing input signals supplied thereto. Voice inputs are controllably supplied from voice input terminals 109 and 110 via controllable switching elements 113 and 111, respectively to, mixer 107. Additionally, an incoming call appearance from incoming path 105 is controllably supplied via controllable switching element 112 to mixer 107. Voice inputs are also controllably supplied from voice input terminals 109 and 110 via controllable switching elements 116 and 114, respectively to, mixer 108. Additionally, an incoming call appearance from incoming path 103 is controllably supplied via controllable switching element 115 to mixer 108.

Controllable switching elements 111, 112 and 113 effectively operate as a multiplexer to controllably supply any combination of the voice inputs supplied from voice input terminals 109 and 110 and from incoming call appearance path 10 to mixer 107. Similarly, controllable switching elements 114, 115 and 116 effectively operate as a multiplexer to controllably supply any combination of the voice inputs supplied from voice input terminals 109 and 110 and from incoming call appearance path 105 to mixer 108. An incoming call appearance is supplied from incoming call appearance path 103 via controllable switching element 122 to mixer 119 and via controllable switching element 124 to mixer 118. Similarly, an incoming call appearance is supplied from incoming call appearance path 105 via controllable switching element 121 to mixer 119 and via controllable switching element 123 to mixer 118. Controllable switching elements 121 and 122 effectively operate as a demultiplexer to supply any combination of the incoming call appearances from incoming call appearance paths 103 and 105 to mixer 119. Similarly, controllable switching elements 123 and 124 effectively operate as a demultiplexer to supply any combination of the incoming call appearances from incoming call appearance paths 103 and 105 to mixer 120., Thus, through the appropriate selection of the ON/OFF settings of controllable switching elements 111 through 116, it is possible to input any mixed combination of the voice inputs supplied to mixer 107 to outgoing call appearance path 103 and it is possible to input any mixed combination of the voice inputs supplied to mixer 108 to outgoing call appearance path 105. It should be noted that any voice input incoming on a call appearance incoming path is not available to be supplied as an output on the corresponding outgoing path of that call appearance. Also, through the appropriate selection of the ON/OFF settings of controllable switching elements 121 and 122, it is possible to input any mixed combination of the voice inputs on incoming call appearance paths 103 and 105 to voice output 119. Similarly, through the appropriate selection of the ON/OFF settings of controllable switching elements 123 and 124, it is possible to input any mixed combination of the voice inputs on incoming call appearance paths 103 and 105 to voice output 120.

Note that the resources for terminal 100 can be implemented physically at terminal 100 or an associated switch or at a private branch exchange (PBX). The former implementation approach is more appropriate for a computer-based distributed packet-voice system, while any of the approaches may be used for a more conventional telephony system. If the resources are implemented at terminal 100, incoming voice signals associated with all the call appearances have to be delivered to terminal 100. If the resources are implemented in the switch (PBX) all voice inputs have to be delivered to the switch (PBX). Additionally, hybrid implementations are possible where input mixing is done at terminal 100 and output mixing is done at the switch (PBX). Consequently, at most, only one voice signal has to be transmitted between terminal 100 and the switch (PBX) in each direction of transmission. These resources can be implemented in hardware, software or some combination thereof at terminal 100 or in the switch (PBX).

Terminal 100, including an embodiment of the invention, enables voice inputs and voice outputs to be simultaneously active on any combination of call appearances 101 and 102 (or N call appearances in the general application of the invention). Also, a user may direct voice inputs to one or more active call appearances at terminal 100. Consequently, at any given time, a user can listen or speak to one or more parties on unrelated calls. This is in contrast to a conferencing system in which the user can simultaneously speak or listen to one or more parties only so long as they are participants in the same conference call or session.

By employing our invention it is possible to implement certain features that are not available through use of current telephony equipment. Examples of such features are so-called "soft hold" and conferencing an existing telephone conversation. Regarding the "soft hold" scenario, consider that in a typical 2-party telephone call involving, for example parties A and B, when one of the parties, for example A, puts the other party, i.e., B, on hold, B may be able to hear music provided by A. When A takes the call off hold, A and B can resume their conversation. Consider that B has a two-line (line-1 and line-2) telephone terminal and that the call from A is on line-1, and further that while A has B on hold, B gets a call on line-2 from C. If B switches to line two, B loses the context of the call on line-1 because he/she no longer hears the music on hold provided by A. If, during B's conversation with C, A takes the original call to B off hold, there is no way to alert B of that fact. By employing an embodiment of our invention, B can hear the audio from both of the call appearances. Thus, B can be talking with C while simultaneously listening to music-on-hold from A. When A does take the call to B off hold, B is immediately alerted to that fact by the termination of the music and resumption of the conversation with A. Then, B has the choice of switching to line-1 having continuously maintained the context of the original call from A.

Regarding conferencing an existing conversation consider a 2-party call scenario involving parties A and B, and that B has a two line telephone terminal. Further, consider that A and B are having a phone conversation during which party C calls B, and that B would like to have A and C hear each other. In a conventional telephone system, B would have to drop both calls and initiate a new conference call involving both A and C. By employing a telephone terminal including an embodiment of the invention, it is easy to redirect A's voice to C and C's voice to A at B's telephone terminal, while maintaining the context of the two existing calls. Indeed, B's voice can be routed to appear simultaneously on both calls. All that is required is that the appropriate ones of controllable switching elements 111 through 116 and 121 through 124 be engaged to accordingly supply the voice signals to the appropriate call appearances 101 and 102 and voice outputs 119 and 120.

What is claimed is:

1. A multiline telephone terminal including apparatus for providing a plurality of call appearances to a user at a terminal, each of said call appearances including an incoming call appearance path and an outgoing call appearance path, the apparatus comprising:

means for controllably simultaneously supplying a first individual distinct signal incoming to the multiline telephone terminal on a first active one of said plurality of call appearances and at least a second individual distinct signal incoming to the multiline telephone terminal on an at least second active one of said plurality of call appearances to said user at the terminal, said first and said at least second incoming signals being from unrelated calls on said first call appearance and said at least second call appearance, respectively, wherein said means for controllably simultaneously supplying includes at least third combining means for controllably, selectively combining unrelated voice signals incoming on separate incoming call appearance paths of said first and at least second ones of said plurality of active call appearances and for supplying as an output on at least one circuit path a single fist combined incoming call appearance signal including first and at least second of said unrelated voice signals incoming on said separate incoming call apperance paths of said first and at least second active call appearances;

first combining means for controllably, selectively combining one or more of a first plurality of voice input signals to form a first combined signal and for supplying said first combined signal to an outgoing call appearance path of a first call appearance of said plurality of call appearances; and at least second combining means for controllably, selectively combining one or more of a second plurality of voice input signals to form a second combined signal and for supplying said second combined signal to an outgoing call appearance path of at least a second call appearance of said plurality of call appearances, wherein said user is able to controllably communicate simultaneously with individual ones of a plurality of distinct and separate ones of said active call appearances but there is no communication among said individual ones of said plurality of said distinct and separate ones of said active call appearances.

2. The invention as defined in claim 1 wherein said first combining means includes first mixer means for mixing signals supplied thereto and for supplying as an output said first combined signal as a first mixed output signal, and wherein said at least second combining means includes second mixer means for mixing signals supplied thereto and for supplying as an output said second combined signal as a second mixed output signal.

3. The invention as defined in claim 1 wherein said first combining means further includes first selection means for controllably selecting individual ones of said first plurality of voice input signals to be supplied to said first combining means, and wherein said at least second combining means further includes second selection means for controllably selecting ones of said second plurality of voice input signals to be supplied to said second combining means.

4. The invention as defined in claim 3 wherein said first selection means includes a first plurality of switching means for controllably selecting said ones of said first plurality of voice input signals, and wherein said second selection means includes a second plurality of switching means for controllably selecting said ones of said second plurality of voice input signals.

5. The invention as defined in claim 1 wherein said at least third combining means includes third mixer means for mixing signals supplied thereto and for supplying as an output said single first combined incoming call appearance signal.

6. The invention as defined in claim 1 wherein said at least third combining means further includes third selection means for controllably selecting ones of said incoming call appearance signals to be combined.

7. The invention as defined in claim 6 wherein said third selection means includes a third plurality of switching means for controllably selecting said ones of said incoming call appearance signals to be combined.

8. The invention as defined in claim 1 wherein said means for controllably simultaneously supplying includes at least fourth combining means for controllably, selectively combining voice signals incoming on separate incoming call appearance paths of said first and at least second ones of said plurality of active call appearances and for supplying as an output on at least one circuit path a single second combined incoming call appearance signal including first and at least second said combined unrelated voice signals incoming on said separate incoming call appearance paths of said first and at least second active call appearances.

9. The invention as defined in claim 8 wherein said at least fourth combining means includes fourth mixer means for mixing signals supplied thereto and for supplying as an output said single second combined incoming call appearance signal.

10. The invention as defined in claim 8 wherein said at least third combining means further includes third selection means for controllably selecting ones of said incoming call appearance signals to be combined and said fourth combining means further includes fourth selection means for controllably selecting ones of said incoming call appearance signals to be combined.

11. The invention as defined in claim 10 wherein said third selection means includes a third plurality of switching means for controllably selecting said ones of said incoming call appearance signals to be combined and said fourth selection means includes a fourth plurality of switching means for controllably selecting ones of said incoming call appearances to be combined.

12. A multiline telephone terminal including apparatus for providing a plurality of call appearances to a user at a terminal, each of said call appearances including an incoming call appearance path and an outgoing call appearance path, the apparatus comprising:

a supply unit to controllably simultaneously supply a first individual distinct signal incoming to the multiline telephone terminal on a first active one of said plurality of call appearances and at least a second individual distinct signal incoming to the multiline telephone terminal on an at least second active one of said plurality of call appearances to said user at the terminal, said first and said at least second incoming signals being from unrelated calls on said first call appearance and at least second call appearance, respectively, wherein said supply unit includes at least third combining means for controllably, selectively combining unrelated voice signals incoming on separate incoming call appearance paths of said first and at least second ones of said plurality of active call appearances and for supplying as an output on at least one circuit path a single first combined incoming call appearance signal including first and at least second of said unrelated voice signals incoming on said separate incoming call appearance paths of said first and at least second active call appearances;

a first combiner to controllably, selectively combine one or more of a first plurality of voice input signals to be supplied as a first combined signal output to an outgoing call appearance path of a first call appearance; and at least a second combiner to controllably, selectively combine one or more of a second plurality of voice input signals to be supplied as a second combined signal output to an outgoing call appearance path of at least a second call appearance, wherein said user is able to controllably communicate simultaneously with individual ones of a plurality of distinct and separate ones of said active call appearances but there is no communication among said individual ones of said plurality of said distinct and separate ones of said active call appearances.

13. The invention as defined in claim 12 wherein said first combiner includes a first mixer to mix signals supplied thereto and to supply as an output said first combined signal as a first mixed output signal, and wherein said second combiner includes a second mixer to mix signals supplied thereto and to supply as an output said second combined signal as a second mixed output signal.

14. The invention as defined in claim 12 wherein said first combiner further includes a first selector to controllably select ones of said first plurality of voice input signals, and wherein said at least second combiner further includes a second selector to controllably select ones of said second plurality of voice input signals.

15. The invention as defined in claim 14 wherein said first selector includes a first plurality of switching elements to controllably select said ones of said first plurality of voice input signals, and wherein said second selector includes a second plurality of switching elements to controllably select said ones of said second plurality of voice input signals.

16. The invention as defined in claim 12 wherein said at least third combiner includes a third mixer to mix signals supplied thereto and to supply as an output single first combined incoming call appearance signal.

17. The invention as defined in claim 12 wherein said at least third combiner further includes a third selector to controllably select ones of said incoming call appearance signals to be combined.

18. The invention as defined in claim 17 wherein said third selector includes a third plurality of switching elements to controllably select said ones of said incoming call appearance signals to be combined.

19. The invention as defined in claim 12 wherein said supply unit includes at least a fourth combiner to controllably, selectively combine voice signals incoming on incoming call appearance paths of said first and at least second ones of said plurality of appearances a step of supplying as an output on at least one circuit path a single first combined incoming call appearance signal including first and at least second of said unrelated voice signals incoming on said incoming call appearance paths of said first and at least second active call appearances;

(b) controllably, selectively combining one or more of a first plurality of voice input signals to form a first combined signal and to supply said first combined signal to an outgoing call appearance path of a first call appearance of said plurality of call appearances; and (c) controllably, selectively combining one or more of at least a second plurality of voice input signals to form a second combined signal and to supply said second combined signal to an outgoing call appearance path of at least a second call appearance of said plurality of call appearances, wherein said user is able to communicate simultaneously with individual ones of a plurality of distinct ones of said active call appearances but there is no communication among said individual ones of said plurality of said distinct ones of said active call appearances.

20. The invention as defined in claim 19 wherein said at least fourth combiner includes a fourth mixer to mix signals supplied thereto and to supply as an output said combined incoming call appearance signal.

21. The invention as defined in claim 19 wherein said at least third combiner includes a third selector to controllably select ones of said incoming call appearance signals to be combined and said fourth combiner further includes a fourth selector to controllably, selectively select ones of said incoming call appearances to be combined.

22. The invention as defined in claim 21 wherein said third selector includes a third plurality of switching elements to controllably select said ones of said incoming call appearance signals to be combined and said fourth selector includes a fourth plurality of switching elements to controllably select ones of said incoming call appearances to be combined.

23. A method for use in a multiline telephone terminal including apparatus for providing a plurality of call appearances to a user at a terminal, each of said call appearances including an incoming call appearance path and an outgoing call appearance path, the method comprising the steps of:

(a) controllably supplying simultaneously a first individual distinct signal incoming to the multiline telephone terminal on a first active one of said plurality of call appearances and at least a second individual distinct signal incoming to the multiline telephone terminal on an at least second active one of said plurality of call appearances to said user at the terminal, said first and at least second incoming signals being from unrelated calls on said first call appearance and said at least second call appearance, respectively, wherein said step of controllably supplying simultaneously includes a first step of controllably, selectively combining unrelated voice signals incoming on separate incoming call appearance paths of said first and at least second ones of said plurality of active call appearances and a step of supplying as an output on at least one circuit path a single first combined incoming call appearance signal including first and at least second of said unrelated voice signals incoming on said separate incoming call appearance paths of said first and at least second active call appearances;

(b) controllably, selectively combining one or more of a first plurality of voice input signals to form a first combined signal and to supply said first combined signal to an outgoing call appearance path of a first call appearance of said plurality of call appearances; and (c) controllably, selectively combining one or more of at least a second plurality of voice input signals to form a second combined signal and to supply said second combined signal to an outgoing call appearance path of at least a second call appearance of said plurality of call appearances, wherein said user is able to controllably communicate simultaneously with individual ones of a plurality of distinct and separate ones of said active call appearances but there is no communication among said individual ones of said plurality of said distinct and separate ones of said active call appearances.

24. The method as defined in claim 23 wherein said step in step (b) of combining signals includes steps of mixing signals supplied thereto and supplying as an output said first combined signal as a first mixed output signal, and wherein said step in step (c) of combining signals includes steps of mixing signals supplied thereto and supplying as an output said second combined signal as a second mixed output signal.

25. The method as defined in claim 23 wherein said step (b) further includes a step of controllably selecting ones of said first plurality of voice input signals to be supplied to be combined, and wherein said step (c) further includes a step of controllably selecting ones of said second plurality of voice input signals to be supplied to be combined.

26. The method as defined in claim 25 wherein said step in step (b) for controllably selecting includes a step of controllably switching to select said ones of said first plurality of voice input signals, and wherein said step in step (c) for controllably selecting includes a step of controllably switching to select said ones of said second plurality of voice input signals.

27. The method as defined in claim 23 wherein said first step in step (a) of controllably, selectively combining unrelated voice signals on said incoming call appearance paths of said plurality of call appearances includes steps of mixing signals supplied thereto and of supplying as an output said single first combined incoming call appearance signal.

28. The method as defined in claim 23 wherein said first step in step (a) of controllably, selectively combining unrelated voice signals on said incoming call appearance paths of said plurality of call appearances includes a step of controllably selecting unrelated ones of said incoming call appearance signals to be combined.

29. The method as defined in claim 28 wherein said step in step (a) of controllably selecting includes a step of switching selected unrelated ones of said incoming call appearance signals to be combined.

30. The method as defined in claim 23, wherein step (a) further includes at least a second step for controllably, selectively combining unrelated voice signals incoming on incoming call appearance paths of said first and at least second ones of said plurality of call appearances and a step of supplying as an output on at least one circuit path a single second combined incoming call appearance signal including first and at least second of said unrelated voice signals incoming on said incoming call appearances of said first and at least second active call appearances.

31. The method as defined in claim 30 wherein said at least second step of step (a) of controllably, selectively combining includes steps for mixing signals supplied thereto and of supplying as an output said single second combined incoming call appearance signal.

32. The method as defined in claim 30 wherein said at least second step of step (a) of controllably, selectively combining further includes a step for controllably selecting ones of said incoming call appearance signals to be combined.

33. The method as defined in claim 32 wherein said at least second step of step (a) of controllably selecting includes a step of switching to select said ones of said incoming call appearance signals to be combined.

* * * * *